US006438470B1

(12) United States Patent
Hiramatsu

(10) Patent No.: US 6,438,470 B1
(45) Date of Patent: Aug. 20, 2002

(54) VEHICLE-MOUNTED CONTROL UNIT HAVING CHECKING PROGRAM INSTALLED THEREIN, INSPECTION DEVICE, AND INSPECTION METHOD

(75) Inventor: Shinya Hiramatsu, Nagoya (JP)

(73) Assignees: Autonetworks Technologies, Ltd., Aichi; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 10/004,928

(22) Filed: Dec. 7, 2001

(30) Foreign Application Priority Data

Dec. 14, 2000 (JP) ........................................ 2000-380032

(51) Int. Cl.[7] ............................................... G06F 7/70
(52) U.S. Cl. .......................... 701/29; 701/31; 324/73.1
(58) Field of Search ............................. 701/29, 31, 32, 701/34, 36, 45; 702/182, 183; 340/439, 991, 992, 993; 73/117.3; 324/73.1

(56) References Cited

U.S. PATENT DOCUMENTS

| 5,771,474 | A | | 6/1998 | Matt et al. | |
|---|---|---|---|---|---|
| 6,104,988 | A | * | 8/2000 | Klarer | ........................ 701/29 |
| 6,134,488 | A | * | 10/2000 | Sasaki et al. | ................. 701/31 |
| 6,175,787 | B1 | * | 1/2001 | Breed | ........................ 701/29 |
| 6,181,992 | B1 | * | 1/2001 | Gurney et al. | ............... 701/29 |
| 6,226,574 | B1 | | 5/2001 | Hiramatsu | |

* cited by examiner

Primary Examiner—Richard M. Camby
(74) Attorney, Agent, or Firm—Oliff & Berridge PLC

(57) ABSTRACT

An inspection program having custom-designed inspection procedures set is stored for each control unit in an inspection program storage section on the control unit. The inspection program is transferred, by means of communications means, to a rewritable inspection program storage section provided in an inspection apparatus. The type of a control unit which is an object of inspection is identified by means of causing the inspection apparatus to run the inspection program. Appropriate input and loads are provided for the control unit, thus causing the control unit to perform inspection procedures.

11 Claims, 6 Drawing Sheets

VEHICLE-MOUNTED CONTROL UNIT HAVING CHECKING PROGRAM INSTALLED THEREIN, INSPECTION DEVICE, AND INSPECTION METHOD

BACKGROUND OF THE INVENTION

1. Technical Field

The present invention relates to a plurality of types of control units which output control signals to electrical components to be mounted on a vehicle, to an inspection device for testing operation of the control unit before shipment, and to an inspection method.

2. Related Art

An automobile or a like vehicle is equipped with a control unit for controlling corresponding electrical components on the basis of the operating status of switches to be used for activating the various electrical components installed in the automobile. A control element having a predetermined control program installed therein beforehand is mounted on a board of the control unit. Further, the control unit is equipped with a plurality of input and output terminals. In response to a signal input to each input terminal, a predetermined control signal is output from an output terminal.

Related-art inspection means for such electrical components have performed the following operation in order to inspect whether or not an input perception function, an internal ROM checking function, and an output function of the control unit operate as designed without involvement of connection failures or a breakdown in a control element. Specifically, there is performed an operation of actually inputting, to each input terminal, a signal identical with a signal input at the time of a normal control operation (i.e., a dummy input signal) and of ascertaining a signal output from each output terminal in response to the input signal.

FIGS. 1 through 3 show the related art configurations of a plurality of types of control unit inspection devices. In each of the configurations, a custom-designed inspection machine is connected to each type of control unit.

As an example model of control unit to become an object of inspection, FIG. 1 shows a control unit 30a. The control unit 30a controls locking/unlocking action of a door lock, ascending/descending action of a power window, and a dome lamp. Moreover, FIG. 2 shows a control unit 30b for controlling right and left turn signals and a dome lamp; and FIG. 3 shows a control unit 30c for controlling a wiper motor, a washer motor, and a dome lamp.

The control unit 30a shown in FIG. 1 for controlling opening/closing action of the door lock, ascending/descending action of the power window, and the dome lamp has input/output terminals provided in Table 1.

TABLE 1

| INPUT CIRCUIT | INPUT TERMINAL | OUTPUT CIRCUIT | OUTPUT TERMINAL |
|---|---|---|---|
| POWER SOURCE ACCESSORY IG | 2s ACC a | DOME LAMP | 3s |
| POWER WINDOW UP | b | POWER WINDOW UP | 3b |
| POWER WINDOW DOWN | c | POWER WINDOW DOWN | 3c |
| DOOR LOCK | d | DOOR LOCK | 3d |
| DOOR UNLOCK | e | DOOR UNLOCK | 3e |
| DOOR (OPEN/CLOSE) | f | | |

The control unit 30b shown in FIG. 2 for controlling the right/left turn signals and the dome lamp has input/output terminals provided in Table 2.

TABLE 2

| INPUT CIRCUIT | INPUT TERMINAL | OUTPUT CIRCUIT | OUTPUT TERMINAL |
|---|---|---|---|
| POWER SOURCE ACCESSORY IG | 2s ACC a | DOME LAMP | 3s |
| LEFT TURN SIGNAL | b | LEFT TURN SIGNAL | 3e |
| RIGHT TURN SIGNAL | c | RIGHT TURN SIGNAL | 3c |
| HAZARD | d | | |
| DOOR (OPEN/CLOSE) | f | | |

The control unit 30c shown in FIG. 3 for controlling the wiper motor, the washer motor, and the dome lamp has input/output terminals provided in Table 3.

TABLE 3

| INPUT CIRCUIT | INPUT TERMINAL | OUTPUT CIRCUIT | OUTPUT TERMINAL |
|---|---|---|---|
| POWER SOURCE ACCESSORY IG | 2s ACC a | DOME LAMP | 3s |
| INTERMITTENT WIPER | b | INTERMITTENT WIPER MOTOR | 3e |
| WASHER | d | WASHER MOTOR | 3c |
| DOOR (OPEN/CLOSE) | f | | |

The control unit has a built-in control circuit. The control circuit produces a predetermined output signal in response to the dummy input signal and outputs the signal, to thereby control each type of electrical component. Of control operations, specific examples of time control performed by a timer will now be described.

(1) A room lamp illumination signal is output from a room lamp terminal for 15 seconds from the time of activation of the signal input to the door switch input terminal (i.e., for 15 seconds from when a door is opened).

(2) From a point in time when the signal input to a switch input terminal of the intermittent wiper is activated, an intermittent wiper motor drive signal is output from an intermittent wiper motor output terminal at intervals of 12 seconds.

(3) A room lamp illumination signal is output from a room lamp terminal for 15 seconds from the time of activation of a signal input to a switch input terminal of the door lock (i.e., for 15 seconds from when the door is locked).

[Problem to be Solved]

Under circumstances where a signal output from a certain specific control unit is inspected through use of the vehicle-mounted control unit inspection apparatus described above, if a signal to be input to the input terminal must be produced by combination of complicated switch logic circuits, the switch logic circuits are actually produced. By means of providing the inspection apparatus with the switch logic circuits, a signal is input to the control unit. Therefore, there has been a necessity for limiting each inspection apparatus to inspection of a specific one type of control unit.

However, a plurality of types of control units are used. If a custom-designed inspection apparatus is installed for each type of control unit, there arises a problem of an increase in inspection costs associated with an increase in the number of pieces of inspection apparatus. Further, if specific control units are manufactured in small number, there arises a problem of an increase in "idle time" during which the inspection apparatus for the control unit is not used.

SUMMARY OF THE INVENTION

The present invention aims at enabling a single inspection apparatus to inspect a plurality of types of control units without use of an inspection apparatus specifically designed for each type of control unit.

[Means for Solving the Problem]

The present invention provides a control unit which is provided in a vehicle, such as an automobile, and outputs a control signal to a corresponding vehicle-mounted electrical component upon being subjected to a user's switching action, the unit comprising: input terminals for receiving control switch signals; output terminals for outputting control signals to respective electrical components; an inspection program having set therein procedures for inspecting the control unit; and an inspection program storage section for storing the inspection program.

By means of the foregoing configuration, an inspection program to be used for inspecting a control unit is stored in a control unit. At the time of inspection of the control unit, the only requirement is that the inspection program be invoked. There is no necessity of preparing an inspection apparatus corresponding to each type of control unit. More specifically, a plurality of types of control units can be inspected through use of a common inspection apparatus.

When a control unit according to the present invention is inspected by means of a time characteristic for normal use (i.e., in a normal control mode), an inspection result is not obtained until output of a signal is completed in the case of a circuit, such as a time control circuit constituted of a timer, which involves a long time interval from when a signal is input until a response signal is output or a long time interval at which a control signal is to be output. This results in an increase in the time required for inspection.

Preferably, the control unit further comprises two types of control modes; that is, a normal control mode in which the control unit performs operation for normal use after having been shipped and mounted on a vehicle, and an inspection mode in which an output signal is output from an output terminal in response to a signal input to an input terminal prior to shipping of the control unit, with a response time shorter than that in the normal control mode. In a normal control mode, the control unit performs a normal control operation, which is to be performed when the control unit is mounted on a vehicle. In the inspection mode, a signal is output, by means of shortening, from that in the normal control mode, the lighting time of a dome light or an interval at which an intermittent wiper motor drive signal is to be output, thereby enabling diminishment of a required inspection time.

Preferably, the control unit further comprises control mode switching means which switches a control mode from the normal control mode to an inspection mode only when a specific input instruction signal is input to a certain input terminal of the input terminals by means of an input method which would not be employed under normal control operation. According to the invention, only a specific input instruction signal is input to a certain input terminal of the input terminals by means of an input method which would not be employed under normal control operation. As a result, the input terminal to be used in a normal control mode can be used also as an input terminal for a control mode switching instruction signal.

An inspection apparatus according to the present invention involves a necessity of running a custom-designed inspection program for each type of control unit to be inspected. The present invention provides a control unit inspection system including a control unit and an inspection apparatus for inspecting the control unit, the system further comprising communications means which, upon receipt of an instruction from the inspection apparatus, transfers a custom-designed inspection program stored in the inspection program storage section provided on each control unit to the inspection apparatus from a specific terminal of the output terminals. As a result, modifications to the inspection program to be run by the inspection apparatus are facilitated.

According to the present invention, the control unit cannot directly run the inspection program stored therein; rather, the inspection program is transferred to the inspection apparatus, where the program must be implemented. The communications means temporarily uses specific input/output terminals of the control unit as input/output terminals for serial communication, thereby enabling transfer of the inspection program stored in the control unit to the inspection apparatus.

The present invention provides an inspection apparatus, wherein an inspection apparatus control section for centralizing inspection procedures has a rewritable inspection program storage section for reading and storing an inspection program which is an inspection procedure specifically designed for each type of control unit and is stored in the control unit. According to the present invention, the inspection program stored in each control unit is transferred to the inspection apparatus by means of the communications means. The inspection program is then stored in the rewritable inspection program storage section provided in the inspection apparatus control section. An inspection program corresponding to the control unit can be implemented, and an inspection program to be implemented by the inspection apparatus can be readily modified.

Preferably, the inspection apparatus control section has model identification means for acquiring information required for specifying the model of a control unit by means of the inspection program transferred by the communications means. According to the present invention, information required for specifying the model of a control unit is retained in the inspection program stored in the inspection program storage section in the control unit. When the inspection program has been transferred to the inspection apparatus, the model of the next control unit to be inspected by the inspection apparatus can be identified.

Preferably, the control unit inspection apparatus further comprises input devices for enabling conduction of a dummy input inspection signal from the input terminal for each type of control unit at the time of inspection of a control unit, and the inspection apparatus control section has input means for controlling the respective input terminals in the inspection apparatus. According to the present invention, each type of control unit has a plurality of input terminals. At the time of inspection of the control unit, the inspection apparatus is provided with input devices which are connected to all input terminals and can control conduction of the respective input terminals. Further, the input devices can be controlled freely, by means of the input means provided in the inspection apparatus control section, thereby enabling input of a dummy input inspection signal.

Preferably, the inspection apparatus control section is provided with a custom-designed input device for each type of control unit to become an object of inspection. The inspection apparatus control section further comprises input device changeover means for switching an input device in accordance with the type of a control unit when a change has arisen in the model of the control unit to be inspected. According to the present invention, the number of input terminals changes in accordance with the type of a control unit. Hence, custom-designed input means constituted of a plurality of switching circuits is prepared for each type of control unit. Every time a change arises in the model of an object of inspection, the input means can be switched.

Preferably, the inspection apparatus further comprises a dummy load storage section having stored therein a plurality of dummy loads which at the time of an operation test receive a signal output from the control unit instead of having each type of electrical component. According to the invention, each type of control unit has a plurality of output terminals. The inspection apparatus has, for each output terminal, an individual dummy load which serves as a substitute for an electrical component to be connected to the control unit when the control unit is mounted on a vehicle, thereby reproducing the same operating situation as that effected when the control unit is mounted on a vehicle. Accordingly, a control operation to be performed by a control unit can be inspected.

Preferably, the inspection apparatus has a custom-designed dummy load storage section provided for each type of control unit to be inspected. Moreover, the inspection apparatus control section has dummy load changeover means for switching a dummy load storage section to be used in accordance with the type of a control unit to be inspected. According to the invention, even when the number of output terminals of an object of control changes according to the model of control unit, a control unit of different type can be inspected, by means of merely preparing a dummy load storage section constituted of a plurality of load circuits, and switching a dummy load storage section to be used every time the model of an object of inspection changes.

The present invention also provides a method of inspecting the control unit inspection device set forth, the method comprising the steps of: storing, into an inspection program storage section provided in each control unit, an inspection program for which custom-designed inspection procedures are set for each type of control unit; transferring, by means of communication means, the inspection program to a rewritable inspection program provided in an inspection apparatus; automatically identifying the model of control units supplied in an arbitrary sequence, by means of causing the inspection apparatus to run the inspection program; and inspecting a plurality of types of control units through use of a single inspection apparatus. According to the present invention, a program for inspecting a control unit is stored in a control unit. Even when control units of different types are supplied to the inspection apparatus in any possible sequence, a single inspection apparatus can inspect the control units appropriately.

DETAILED DESCRIPTION OF THE PREFERRED EMBODIMENTS

Figure 4:
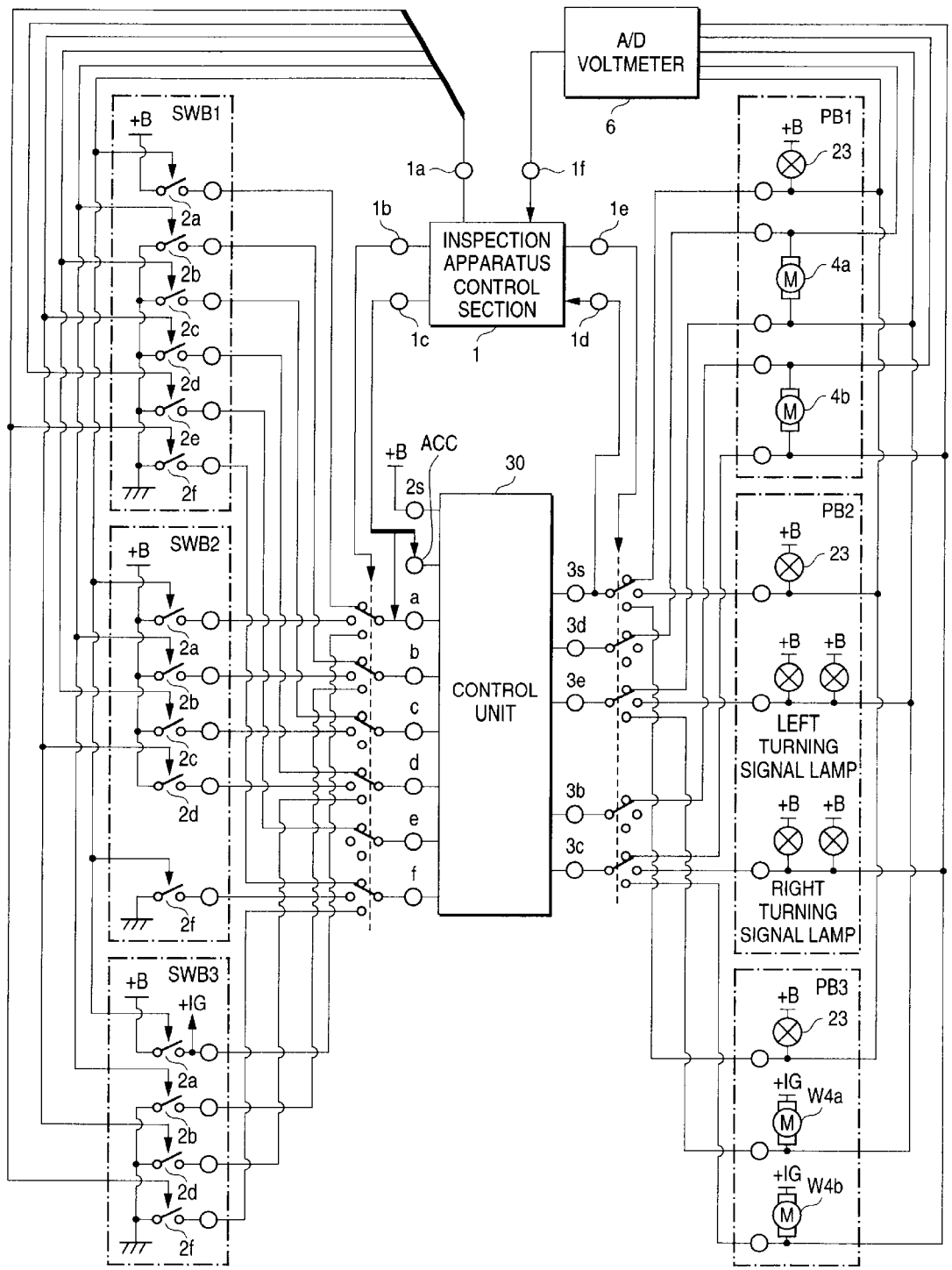
FIG. 4 is a block diagram showing the functional configuration of a switch box and a load box of the inspection apparatus according to an embodiment of the present invention, and connection of the switch box and the load box to the control unit.
Figure 5:
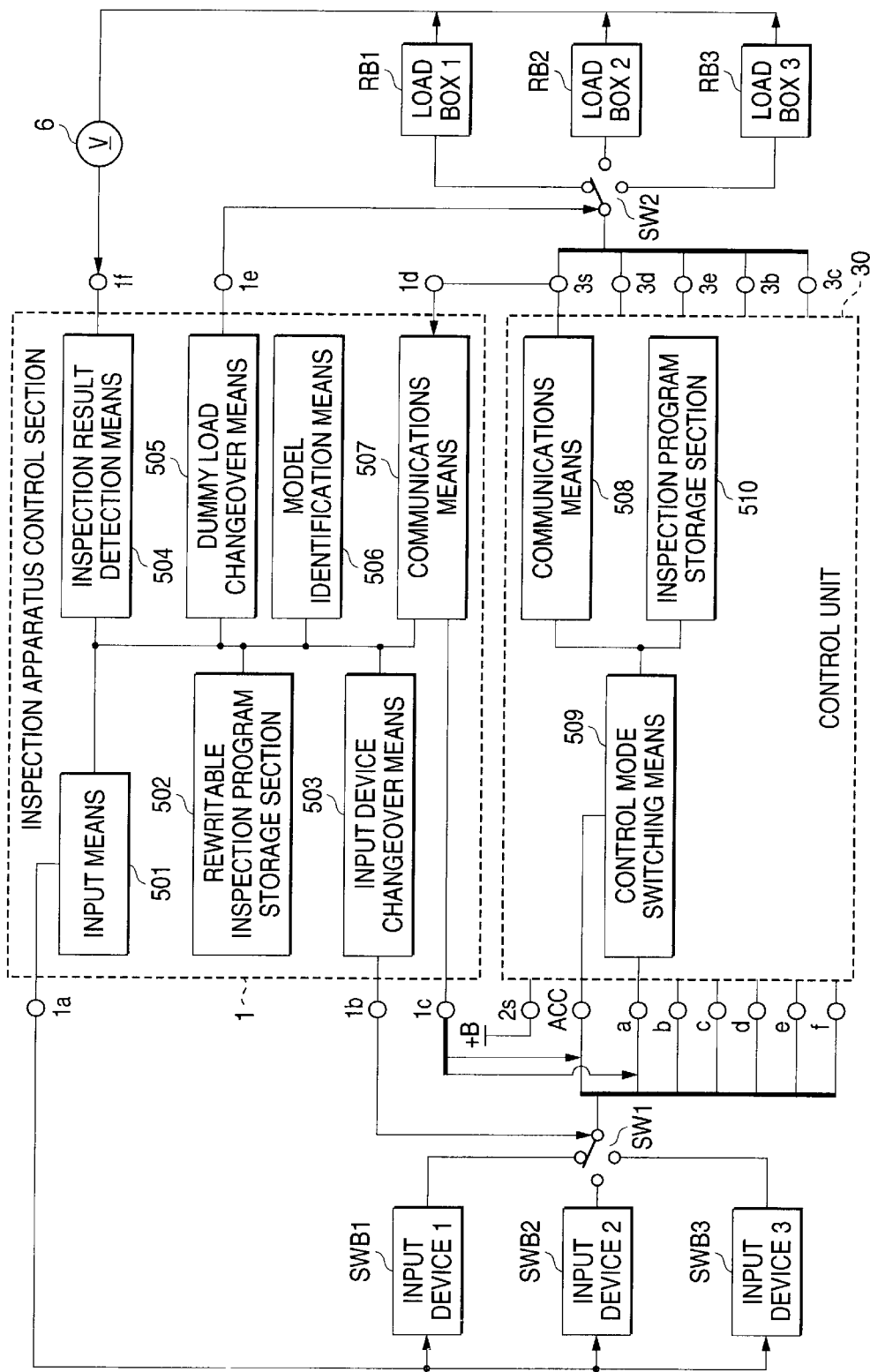
FIG. 5 is a block diagram showing the functional configuration of the control unit and that of a control section of the inspection apparatus, both pertaining to the present embodiment.

FIG. 4 is a block diagram showing connection of an inspection apparatus according to an embodiment of the present invention to a control unit, as well as the functional configuration of a switch box and a load box provided in the inspection apparatus. FIG. 5 is a block diagram showing the functional configuration of a control unit and an inspection apparatus control section according to the embodiment.

In the present embodiment shown in FIG. 5, lines of an inspection apparatus are connected to respective input terminals of the control unit 30 for testing the operation of the control unit 30. The inspection apparatus comprises switch boxes SWB1 through SWB3, which are input devices for inputting an inspection signal in response to each type of control unit; load boxes RB1 through RB3, which are a plurality of dummy load storage sections provided for respective types of control units; an analog-to-digital voltmeter 6, which detects the operation of the control unit and effects feedback after having digitally encoded the detection result; and an inspection apparatus control section 1 having control over the constituent elements.

The inspection apparatus control section 1 is primarily constituted of the following elements; that is, input means 501, a rewritable inspection program storage section 502; input device changeover means 503; dummy load changeover means 505; model identification means 506; and communications means 507. The inspection apparatus control section 1 conducts tests on a plurality of types of control units.

Figure 1:
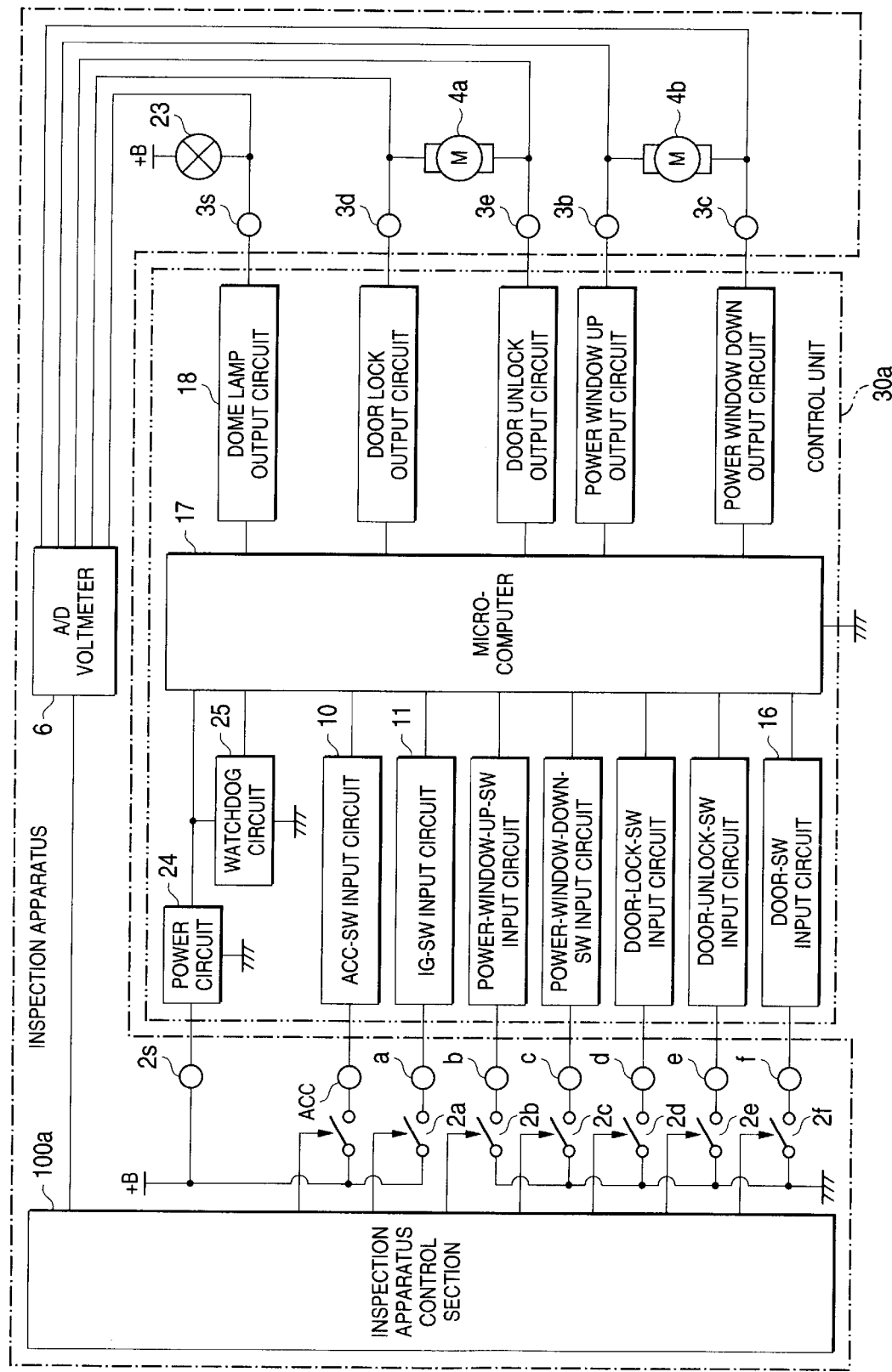
FIG. 1 is a block diagram showing the functional configuration of a control unit for controlling opening/closing of a door lock, ascending/descending action of a power window, and a dome lamp and that of an inspection apparatus for inspecting the control unit.
Figure 2:
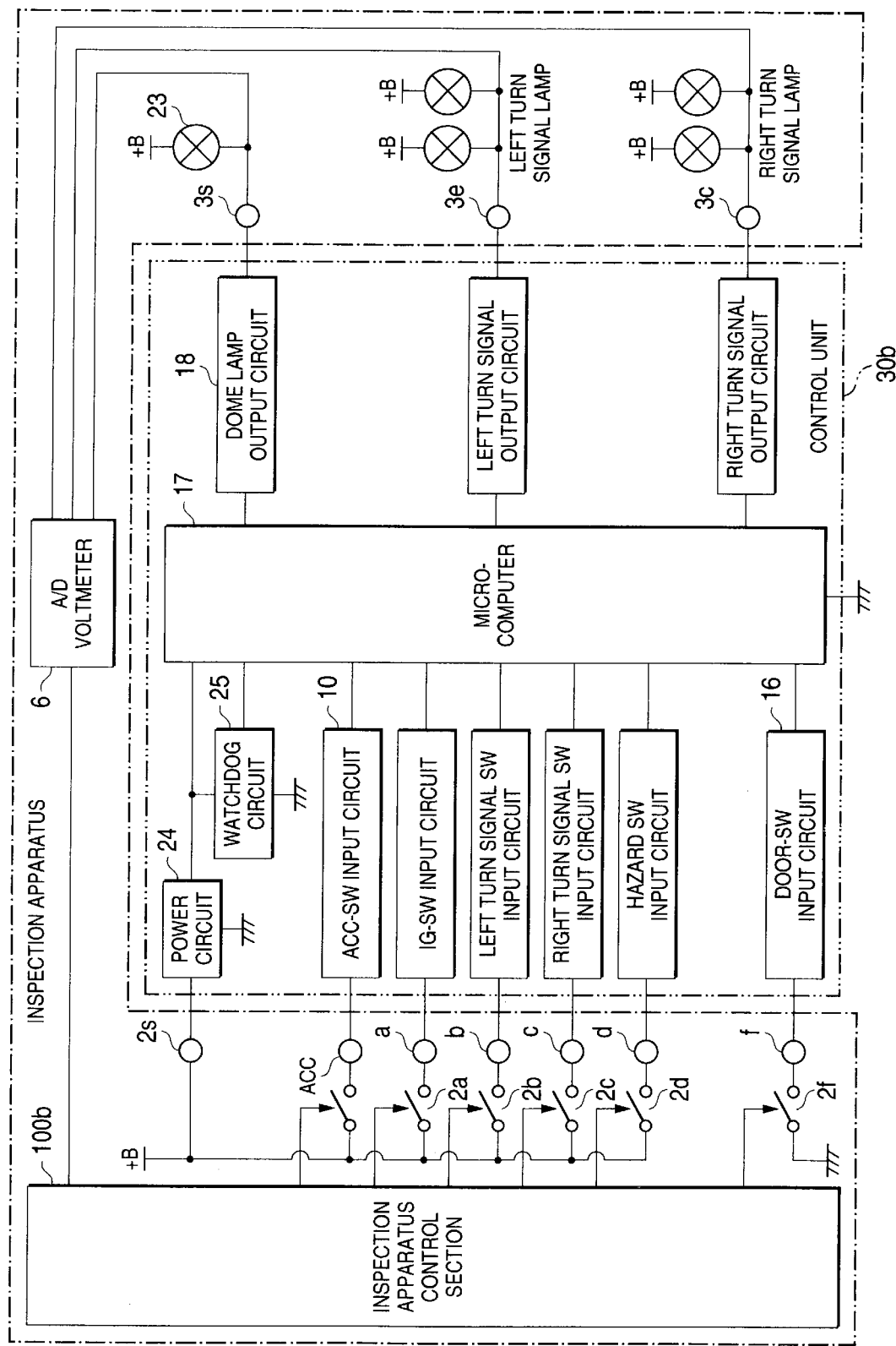
FIG. 2 is a block diagram showing the functional configuration of a control unit for controlling left/right turn signals and a dome lamp and that of an inspection apparatus for inspecting the control unit.
Figure 3:
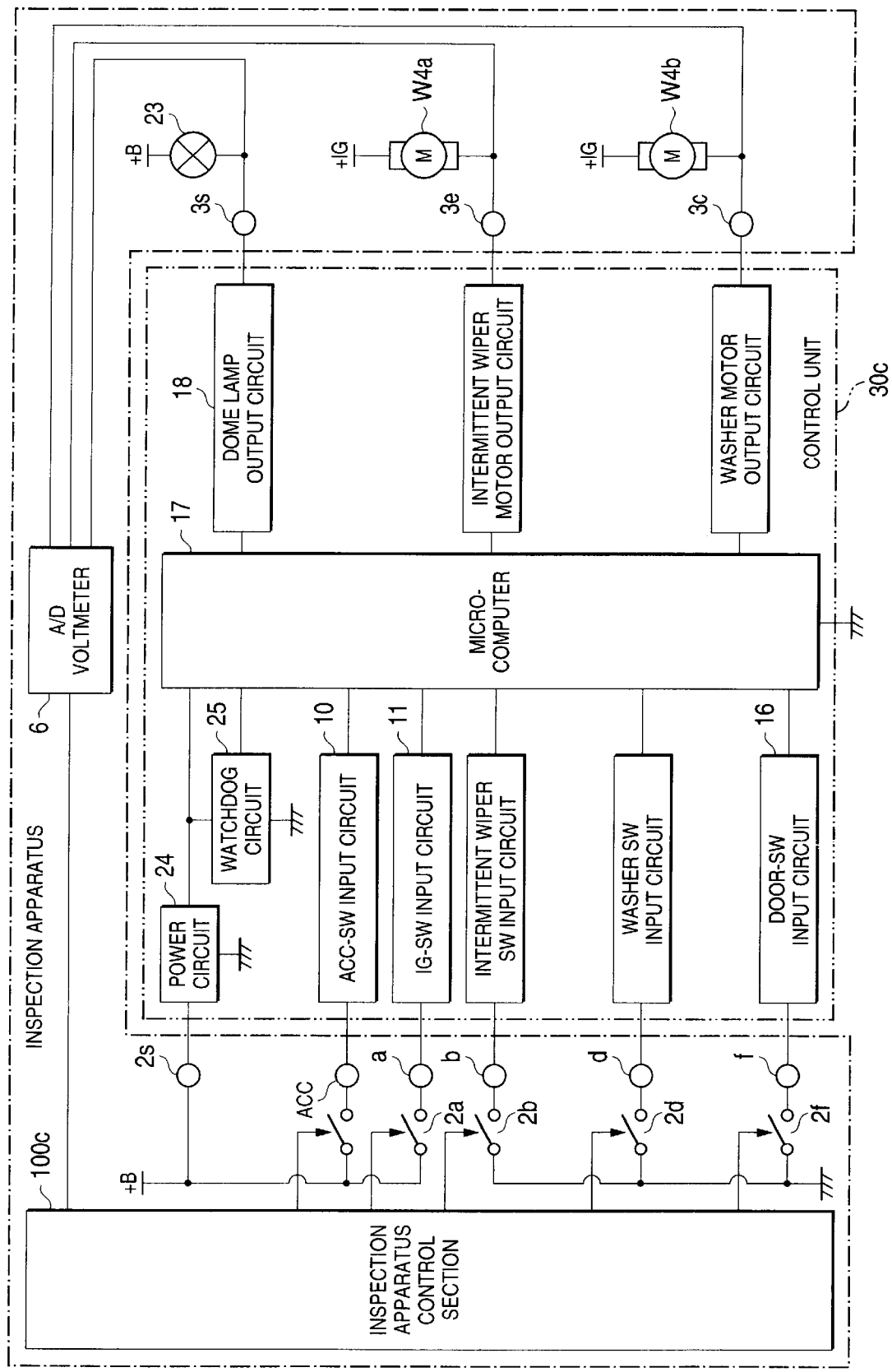
FIG. 3 is a block diagram showing the functional configuration of a control unit for controlling a wiper motor, a washer motor, and a dome lamp and that of an inspection apparatus for inspecting the control unit.

A control unit 30 shown in FIG. 4 is a generic name for control units 30a, 30b, and 30c shown in FIGS. 1 through 3. The control units are to be inspected by the inspection apparatus according to the present invention. Consequently, the control unit 30a shown in FIG. 1, the control unit 30b shown in FIG. 2, and the control unit 30c shown in FIG. 3 are each equipped with a power circuit 24, a watchdog circuit 25, an ACC-SW input circuit 10, an IG-SW input circuit 11, a door SW input circuit 16, and a dome lamp output circuit 18. Other input/output circuits are unique to each type of control unit. Each of the three types of control units 30a, 30b, and 30c has two types of control mode; namely, a normal control mode in which the control unit performs an operation for normal use after having been mounted on a vehicle; and an inspection mode employed only at the time of inspection. Only a control unit of the inspection system according to the present invention includes communications means 508 and an inspection program storage section 510, which are shown in FIG. 5 and are required for effecting serial communication to be described later. In this regard, the control unit differs from the control units of related-art types in terms of constituent elements.

The control unit of related-art type is usually in a normal control mode. Further, a built-in timer outputs a time control signal relating to a time for illuminating a room lamp or to a time interval at which an intermittent wiper is to be activated, with use of a time characteristic for normal use. Hence, when the control unit is inspected in a normal control mode, the time required to complete all inspection items is increased by the time required for a time control signal to be output from the timer.

In the present embodiment, in order to shorten the time required to effect inspection, a specific switching operation is performed at the time of inspection. Inspection procedures are performed after the control unit has been switched to an inspection mode. In the inspection mode, the illumination time of the room lamp and the time interval at which the intermittent wiper motor drive signal is to be output are shortened to one second or less, and the time control signal is output, thus shortening the time required to conduct inspection. The control unit is usually in a normal control mode, unless a specific switching operation is performed. Hence, after the unit has been mounted on a vehicle, no switching arises from a control mode to an inspection mode during normal use of the control unit.

In the present embodiment, only when a specific switching instruction signal is input to a specific one of the input terminals of the control unit 30 according to an input method which is in effect during normal use, the control mode is switched from the normal control mode to the inspection mode. The input terminal used in the normal control mode is also used as a terminal into which a control mode switching instruction signal is to be input. Here, a terminal 2s is a power input terminal, and power is fed to the terminal 2s during inspection.

Figure 6:
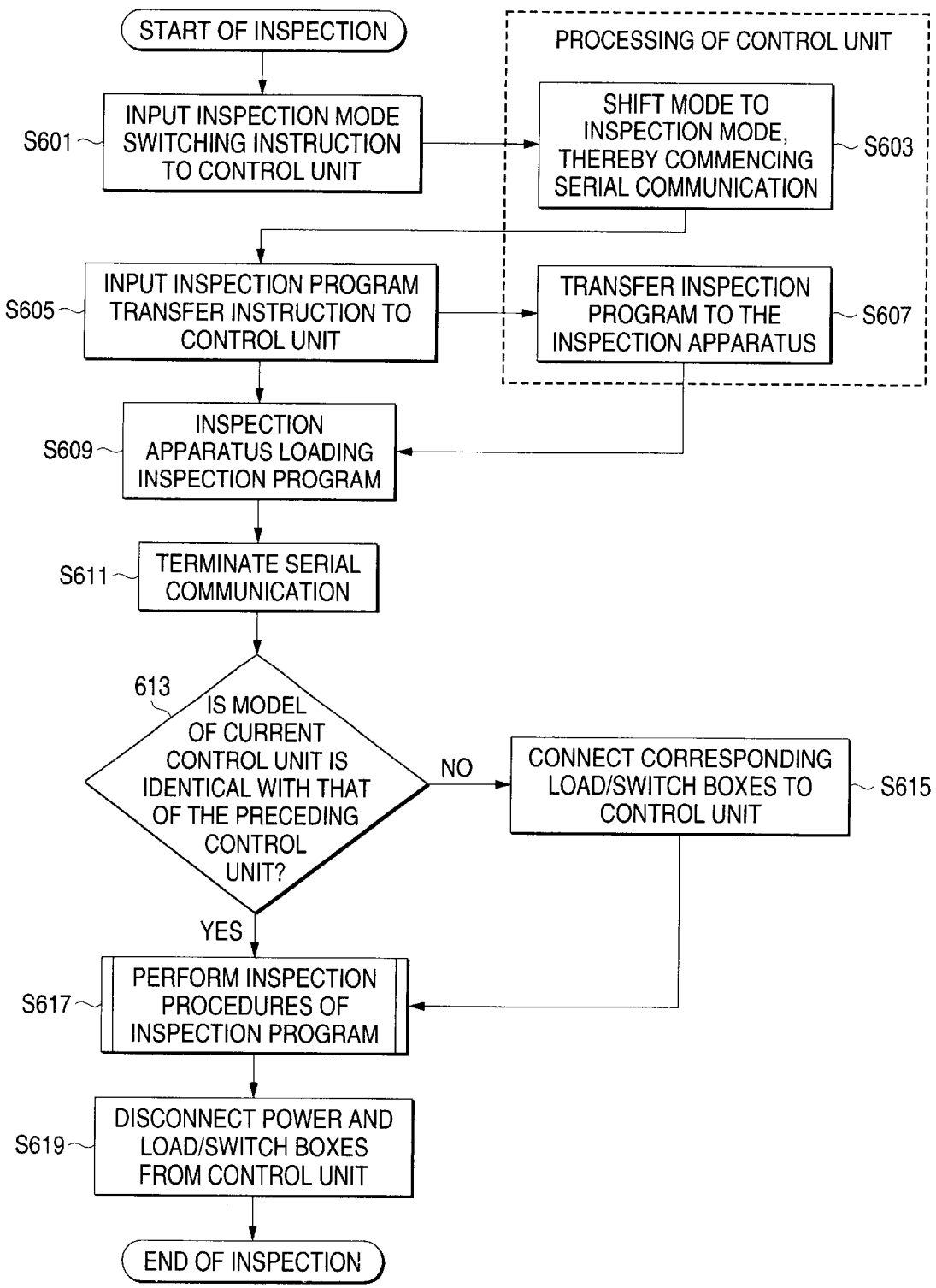
FIG. 6 is a flowchart showing operation of the control unit and that of the inspection apparatus, both pertaining to the present embodiment.

FIG. 6 shows, in the form of a flowchart, operations of the control unit and those of the inspection apparatus according to the present embodiment.

In step S601, communications means 507 of the inspection apparatus control section 1 iteratively inputs, a predetermined number of times (twice in the embodiment), a control mode switching instruction signal (which is constituted of a pulse signal whose geometry would never arise during normal use) to the ACC-SW terminal of the accessory input circuit 10 and a terminal "a" of the IG-SW input circuit 11. Only when the control mode switching instruction signal is input to the control unit 30, control mode switching means 509 provided in the control unit 30 is activated, thereby switching a control mode from the normal control mode to the inspection mode (in S603 shown in FIG. 6). In connection with the control mode switching instruction signal, signals having ON-OFF waveforms whose phases are opposite to each other must be input to the IG input terminal "a" and the accessory input terminal ACC. In this way, there is prevented occurrence of erroneous input to the terminals, which would otherwise arise during normal use.

Each type of control unit controls vehicle-mounted electrical components of different types. Hence, there are a plurality of types of control units to be inspected. Further, the control units differ from each other in terms of the number of objects of control. Hence, inspection items of a control unit change in accordance with the model of the control unit. For this reason, an inspection program, which corresponds to inspection procedures, must be prepared specifically for each model. According to the present invention, the control unit is provided with a read-only semiconductor storage device, and the inspection program assigned to the control unit is stored in the storage device.

The respective types of control units 30a, 30b, and 30c, which are objects of control, are provided with an inspection program in which inspection procedures that vary with the type of control unit are set, and an inspection program storage section 510 for storing the inspection program. In the present embodiment, three types of control units are to become objects of control. Each type of control unit controls vehicle-mounted electrical components of different types. Further, objects of control vary with the type of control unit. Therefore, there is a necessity of preparing a custom-designed inspection program for each type of control unit. In contrast with the prior art, according to the present invention, a program is not installed in an inspection apparatus. Instead, each control unit 30 is provided with a storage medium, and an inspection program is stored in the medium.

The inspection apparatus control section 1 is provided with a rewritable inspection program storage section 502. In order to enable a single inspection apparatus to implement an inspection program which relates to custom-designed inspection procedures and is set for each type of control unit, the inspection program storage section 502 loads a different inspection program for each type of control unit and overwrites an existing program with the thus-loaded inspection program, thus effecting program updating. In the present embodiment, each type of control unit, which is an object of inspection, must be caused to run a custom-designed inspection program. Since the control unit can run a stored inspection program, the inspection program is stored in the rewritable storage section 502 in the inspection apparatus control section through the following procedures.

In step S605 shown in FIG. 6, the inspection apparatus control section 1 inputs an instruction signal to the control unit 30 through use of the communication means 507 and by way of a terminal 2a of an IG-SW input circuit. The instruction signal is for commencing transmission of an inspection program stored in the inspection program storage section 510 provided within the control unit to the inspection apparatus through use of the communications means 508 provided in the control unit.

Upon receipt of the instruction signal, the control unit 30 commences transfer of the inspection program from the terminal 3s of the dome lamp output circuit 18 through serial communication. The inspection program is then stored in the rewritable inspection program storage section 502 provided in the inspection apparatus control section 1 (in step S609 shown in FIG. 6) Conclusion of elapsed time arises after one second has passed following completion of transfer of all data pertaining to the inspection program and stopping of transfer of data from the control unit 30, and the inspection apparatus control section 1 terminates serial communication (in step S611 shown in FIG. 6) At this point in time, the inspection program is stored in the inspection apparatus control section 1, and implementation of inspection procedures becomes possible.

In step S613 shown in FIG. 6, the inspection apparatus control section 1 specifies the model of the control unit that is an object of current inspection, by means of the model identification means 506. In the present embodiment, information required for specifying the model of the control unit is written in the beginning of the inspection program that has been transferred from the control unit 30 by means of the communication means 508. After completion of transfer of the inspection program to the inspection apparatus, the model of the currently-connected control unit is identified at a point in time when implementation of the program is started.

The inspection apparatus according to the present embodiment has switching circuits (2a through 2f shown in FIGS. 1 through 4). At the time of a test on operation of the control unit, the switching circuits enable conduction of a dummy input inspection signal from each input terminal in accordance with the type of control unit. The inspection apparatus control section 1 has the input means 501 for controlling the switching circuits. Each type of control unit has a plurality of input terminals. The inspection apparatus is provided with switching circuits (2a through 2f) which can be individually controlled to be electrically connected to the respective input terminals (a through f). All the switching circuits are housed in one switch box, thereby constituting the input apparatus. Conduction of switches provided in the switch box is controlled, by means of the input means 501 of the inspection apparatus control section 1. Presence/absence (on/off) of a voltage at each input terminal of the control unit, which is an object of inspection, is controlled freely, thereby enabling input of a dummy input inspection signal.

The inspection apparatus according to the present embodiment has a dummy load storage section. The dummy load storage section houses a plurality of dummy loads for receiving a signal output from the control unit during inspection instead of having each type of electrical component. A control unit of each type has a plurality of output terminals. Dummy load circuits serving as alternatives to electrical components of various types to be connected to the control unit when mounted on a vehicle are individually provided on the inspection apparatus so as to correspond to the respective output terminals (3s, 3d, 3e, 3b, and 3c). Circuits for all dummy loads are stored in one load box, thereby constituting the dummy load storage section. A dummy load is activated by means of a control signal output from the control unit which is an object of inspection, thereby re-creating the same operating situation as that created by the control unit when mounted on a vehicle. In this manner, the control operation of the control unit is inspected.

In the present embodiment, each of the control units 30a, 30b, and 30c has a different number of input/output terminals. For each model of control unit, the inspection apparatus is individually provided with a switch box corresponding to a custom-designed input device and with a load box corresponding to a custom-designed output device. Every time the model of an object of inspection is changed, switching between the input means (the switch boxes SWB1, SWB2, and SWB3) and switching between dummy load storage sections (the load boxes RB1, RB2, and RB3) are performed through the following procedures, by means of the input device changeover means 503 and the dummy load changeover means 505 of the inspection apparatus control section 1.

In step S613 shown in FIG. 6, the inspection apparatus control section 1 determines the type of model of a control unit being inspected, on the basis of information about the model of a control unit acquired by the model identification means 506. When having determined that the model of a control unit which is an object of current inspection has been changed from that of the object of the previous inspection, the inspection apparatus control section 1 controls the switching circuit (SW1 shown in FIG. 5) by means of the input device changeover means 503. In accordance with the type of control unit, the input device is switched (in step S615), thereby connecting an appropriate switch box to the input terminals "a" through "f" provided in the control unit.

In tandem with procedures for switching the input device in steps S613 through S615 shown in FIG. 6, the inspection apparatus control section 1 switches a dummy load storage section (a load box). If in step S613 the model of the control unit that is an object of current inspection has been determined to differ from that of the object of the previous inspection, the dummy load changeover means 505 controls the switching circuit (SW2 shown in FIG. 5). In accordance with the type of control unit, switching between the load boxes is performed (step S615), thereby connecting an appropriate load box to the output terminals (3s, 3d, 3e, 3b, and 3c) of the control unit. If the model of the object of current inspection is determined to be identical with that of the object of the previous inspection, inspection procedures are performed without involvement of switching between the input devices and that between the load boxes.

In step S617 shown in FIG. 6, the inspection apparatus implements the inspection program stored in the rewritable inspection program storage section 502 provided in the inspection apparatus control section 1. In connection with control of electrical components in an inspection mode, example time control signals output from a timer will now be described.

(1) A loom lamp illumination signal is output from the dome lamp terminal 3s for 0.2 seconds (15 seconds under normal conditions) from the time of activation of the signal input to the door input terminal "f" (i.e., from the time of opening of a door).

(2) An intermittent wiper motor drive signal is output twice at an interval of 0.2 seconds (12 seconds under normal conditions) from the intermittent wiper motor output terminal 3e from the time of activation of the signal input to the switch input terminal of the intermittent wiper.

(3) A room lamp illumination signal is output from the dome lamp terminal 3s for 0.2 seconds (15 seconds under normal conditions) from the time of activation of signal input to the door lock input terminal "d" (i.e., from the time the door is locked).

Through the inspection procedures, output of all the time control signals from the timer is completed within a period of time much shorter than that in a normal control mode. The time required to conduct an inspection can be greatly shortened from that required in a normal control state, whereby inspection efficiency is improved remarkably.

The inspection apparatus has a feedback circuit constituted of the analog-to-digital voltmeter 6. The feedback circuit measures a voltage across dummy loads provided in the load box, encodes the voltage into a digital signal, and transmits the digital signal to the inspection apparatus control section 1. On the basis of the feedback performed by the analog-to-digital voltmeter 6, a determination is made as to whether the operation of the control unit is good or no good. In the present embodiment, the analog-to-digital voltmeter 6 measures voltages appearing at all terminals connected to the dummy loads which are provided in the load box so as to correspond to the type of the control unit, thereby detecting a voltage across individual loads. Information about the detected voltage is digitally encoded, and the resultant signal is fed back to the inspection apparatus, thus determining whether the control operation of the control unit, which is an object of inspection, is good or no good.

At a point time when procedures of the inspection program have been completed, an inspection result is obtained. When in step S619 the loads, the switch box, and the power terminal 2s connected to the control unit 30 are disconnected from the inspection apparatus, the control mode is restored to the normal control mode. Eventually, the control unit 30 is brought into an off-the-shelf state.

In addition to the above embodiment, the present invention can be embodied in the following manner.

In the embodiment, the IG terminal, the ACC terminal, and the dome lamp terminal are utilized as input/output terminals for the control mode changeover instruction signal and the serial communication signal. The input/output terminals for communication are not limited to these terminals. For example, the terminal "f" of the door input circuit 16 and a terminal (not shown) of a key switch input circuit can be utilized as input terminals for serial communication. Moreover, an alarm sound output circuit and an alarm lamp may be included in an object to be controlled by the control unit, and control signal output terminals of the circuit and the lamp can be utilized as output terminals for serial communication.

The number of models of the control units according to the present invention is not limited to three; the inspection apparatus can be applied to inspection of all control units of two types or more. As in the case of the embodiment, a custom-designed inspection program is stored for each type of control unit, and custom-designed switch and load boxes are prepared for the inspection apparatus, thereby increasing the number of selectable alternatives for SW1 and SW2 shown in FIG. 5. As a result, control units of three or more types can be inspected through the same procedures as those set forth.

According to the present invention, an inspection program having set inspection procedures is stored in each of control units which are to become objects of control. At the time of inspection, the inspection program is transferred to an inspection apparatus by means of communications means, whereby the inspection program is caused to run. Thus, appropriate inspection procedures for a control unit can be implemented.

As an advantage of the present invention, there is obviated a necessity for providing a custom-designed inspection apparatus for each of a plurality of types of control units. Accordingly, there is prevented occurrence of an increase in inspection costs, which is a drawback of the related art and would otherwise be induced in accordance with the number of types of control units.

The present invention has established an inspection method of automatically identifying the type of control units supplied in an arbitrary sequence and inspecting a plurality of types of control units through use of a single inspection apparatus. Consequently, even when different types of control units are supplied to the inspection apparatus in any possible sequence, a single inspection apparatus can appropriately inspect the control units.

The inspection method yields the advantage of the ability to improve the availability factor of the inspection apparatus without involvement of idle time even when, e.g., a small number of control units of certain types are manufactured.

What is claimed is:

1. A control unit which is provided in a vehicle, and outputs a control signal to a corresponding vehicle-mounted electrical component upon being subjected to a user's switching action, said control unit comprising:

input terminals for receiving control switch signals;

output terminals for outputting control signals to respective electrical components; and an inspection program storage section for storing an inspection program having set therein procedures for inspecting said control unit.

2. The control unit according to claim 1 has two types of control modes of:

a normal control mode in which said control unit performs operation for normal use after having been shipped and mounted on a vehicle, and an inspection mode in which an output signal is output from an output terminal in response to a signal input to an input terminal prior to shipping of said control unit with a response time shorter than a response time in the normal control mode.

3. The control unit according to claim 1, further comprising:

control mode switching means which switches a control mode from the normal control mode to an inspection mode, only when a specific input instruction signal is input to a certain input terminal of said input terminals, and by means of an input method which is not be employed under normal control operation.

4. The control unit inspection system comprising:

said control unit according to claim 1, and an inspection apparatus for inspecting said control unit, communications means which, upon receipt of an instruction from said inspection apparatus, transfers a custom-designed inspection program stored in said inspection program storage section provided on each control unit to said inspection apparatus from a specific terminal of said output terminals.

5. The control unit inspection apparatus for inspecting said control unit described in claim 1, comprising:

a rewritable inspection program storage section for reading and storing an inspection program stored in said control unit, wherein an inspection apparatus control section provided in said inspection apparatus implements the inspection program.

6. The control unit inspection apparatus according to claim 5, further comprising:

model identification means for acquiring information required for specifying a model of a control unit by means of the inspection program transferred by said communications means.

7. The control unit inspection apparatus according to claim 5, further comprising:

input devices for enabling conduction of a dummy input inspection signal from said input terminal for the type of a control unit at the time of inspection of said control unit; wherein said inspection apparatus control section includes input means for controlling said respective input terminals in said inspection apparatus.

8. The control unit inspection apparatus according to claim 5, further comprising:

a custom-designed input device provided for each type of a control unit to be an object of inspection; and input device changeover means for switching an input device to be used in accordance with the type of a control unit which is an object of inspection.

9. The control unit inspection apparatus according to claim 5, further comprising:

a dummy load storage section storing therein a plurality of dummy loads which at the time of an operation test receive a signal output from said control unit, instead of each type of electrical component.

10. The control unit inspection apparatus according to claim 5, further comprising:

a custom-designed dummy load storage section provided for each type of control unit to be inspected; wherein said inspection apparatus control section includes dummy load changeover means for switching a dummy load storage section to be used in accordance with the type of a control unit to be inspected.

11. A method of inspecting a control unit through use of an inspection system, the control unit is provided in a vehicle, and outputs a control signal to a corresponding vehicle-mounted electrical component upon being subjected to a user's switching action, said control unit comprising:

input terminals for receiving control switch signals;

output terminals for outputting control signals to respective electrical components; and an inspection program storage section for storing an inspection program having set therein procedures for inspecting said control unit;

the inspection system comprising:

an inspection apparatus for inspecting said control unit, communications means which, upon receipt of an instruction from said inspection apparatus, transfers a custom-designed inspection program stored in said inspection program storage section provided on each control unit to said inspection apparatus from a specific terminal of said output terminals;

said method comprising the steps of:

storing, into an inspection program storage section provided in each control unit, an inspection program for which custom-designed inspection procedures are set for each type of control unit;

transferring, by means of communication means, the inspection program to a rewritable inspection program provided in an inspection apparatus;

automatically identifying the models of control units supplied in an arbitrary sequence by means of causing said inspection apparatus to run the inspection program; and inspecting a plurality of types of control units through use of a single inspection apparatus.

* * * * *